G. A. BYOR.
SCOOP HANDLE.
APPLICATION FILED MAR. 12, 1908.
911,291.
Patented Feb. 2, 1909.
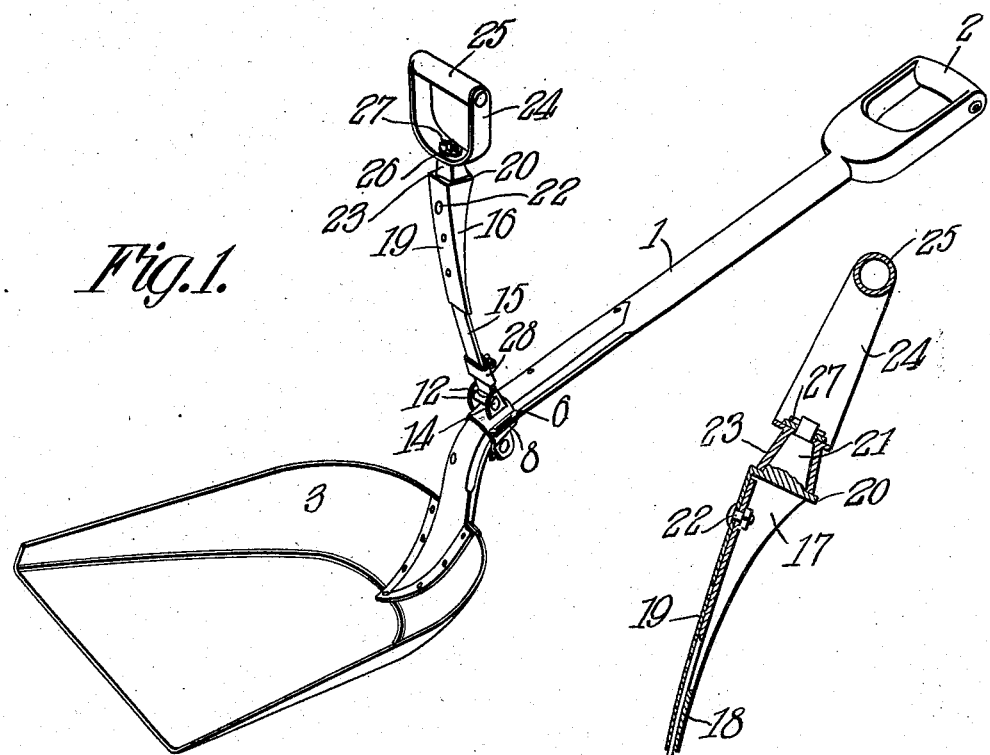
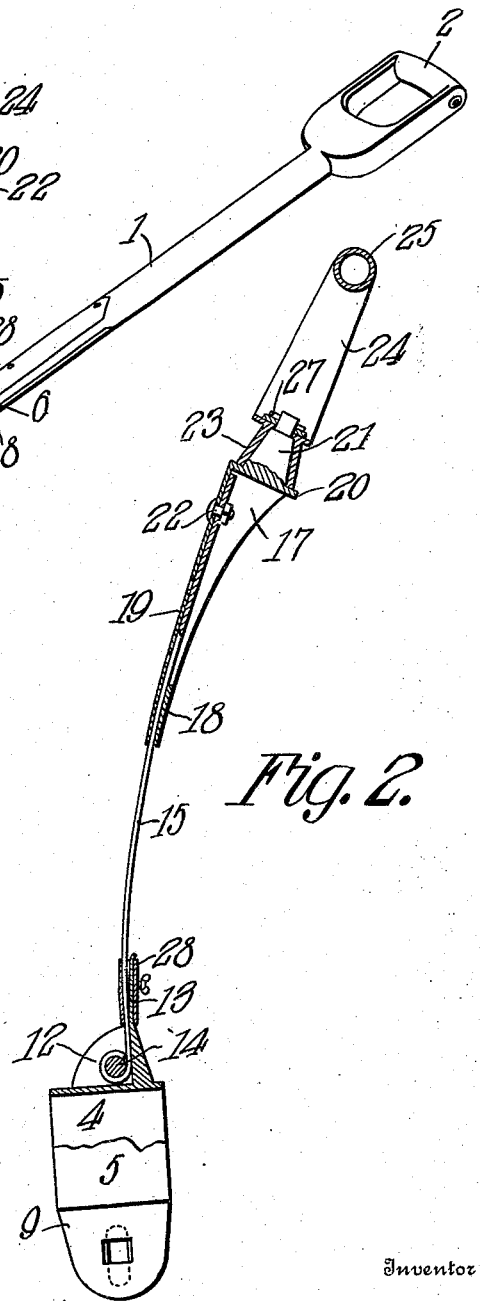
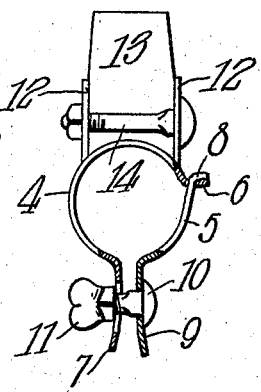
Witnesses
Inventor
Gustav A. Byor,
By C. A. Snow & Co.
Attorneys

UNITED STATES PATENT OFFICE.

GUSTAV A. BYOR, OF EDGAR, NEBRASKA.

SCOOP-HANDLE.

No. 911,291.　　　　Specification of Letters Patent.　　　　Patented Feb. 2, 1909.

Application filed March 12, 1908.　Serial No. 420,680.

*To all whom it may concern:*

Be it known that I, GUSTAV A. BYOR, a citizen of the United States, residing at Edgar, in the county of Clay and State of Nebraska, have invented a new and useful Scoop-Handle, of which the following is a specification.

This invention relates to improvements in auxiliary handles for shovels, scoops, pitch forks, and other like implements requiring the use of both hands to operate them.

It has for its object to provide a means by which the load carried by the implement to which it is applied may be handled with greater ease by the operator than if the shank of the implement were grasped.

Most devices of this kind heretofore in use, while greatly increasing the leverage and thereby enabling the operator to lift the load with greater ease, made no provision for easing the manner of loading the implement or delivering the load therefrom.

The present invention aims to remedy this defect by so constructing an auxiliary handle for a scoop, shovel or other like implement so that the same can be loaded or filled with grain, hay, or other material with small effort on the part of the operator and thrown to a greater distance with less effort than if the handle were grasped in the ordinary way.

Another object of the device is to render the handle adjustable which may be found very advantageous by different sized operators.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

In the accompanying drawings:—Figure 1 is a perspective view of the device applied to the handle of an ordinary shovel. Fig. 2 is a vertical section of the device. Fig. 3 is a horizontal section.

Similar numerals of reference are employed to indicate corresponding parts throughout the several figures of the drawings.

The shackle is adapted to be applied to the shank 1 of a shovel, fork or other like implement at a convenient distance from the handle and preferably adjacent the scoop 3. The shackle in the present instance is composed of two sections 4 and 5 formed of metal or other suitable material, the section 4 having an inwardly curved upper portion adapted to extend from the middle portion beneath the shank up over and around to the middle of the side thereof, and the end turned at right angles to the shank forming a lug 6 provided with a longitudinal perforation. The lower portion of the section 4 extends downward forming a lug 7 provided with an elongated perforation extending nearly the length of the lug, the function of which will presently appear. The section 5 has on one end a tongue 8 turned at right angles and adapted to enter the perforated lug 6, thus forming a hinge by which the sections are connected.

Immediately below the tongue 8 the section 5 is curved to overlie the shank 1 and the lower portion extends downwardly forming a lug 9 similar to and extending parallel with the lug 7. The former is provided with a perforation for the reception of a screw or bolt 10, the threaded end of which extends into and beyond the elongated perforation forming the lug 7. With this construction it is obvious that the shackle can be applied to and firmly secured to the shank 1 of a scoop, fork or other like implement and the provision of the elongated slot renders the shackle adjustable to the various sizes of shanks. Cast integral therewith or otherwise secured to the section 4 and disposed on the top thereof so as to overlie the top or upper surface of the shank 1 is a pocket having vertical side walls 12 with curved outer faces and a rear wall 13 secured to the side walls, and of considerably greater length than the latter having a portion extending above the walls 12 slightly curved outwardly, the function of which will presently appear. The side walls 12 are provided with registering perforations for the reception of a shaft in the form of a bolt 14 which pivotally supports the auxiliary shank 15 formed of a rectangular strip of spring steel or other resilient material, the latter end of which is turned to form a loop for the reception of the shaft 14. An extension sleeve 16 adapted to slidingly fit over the auxiliary shank 15 has the rear wall cut-away leaving the space between the side walls 17 open except at their lower ends, where a plate 18 connects the walls and forms with the side walls 17 and front wall 19 a seat for the reception of the auxiliary shank 15. The side walls of the extension sleeve curve outwardly and on their upper ends is formed a platform 20 which supports a conical stud 21. The front wall 19 of the extension sleeve is provided with a plurality of perforations adapted to register with a single perforation formed in the auxiliary shank 15. By sliding the sleeve on the shank a bolt and nut 22 enters the perforations and secures the parts in adjusted position, as shown in Fig. 2. With this construction it is obvious that the device may be longitudinally adjusted, so as to suit the operator. This will be found very advantageous by tall operators who may adjust the sleeve to any required height, thus greatly reducing the distance they would ordinarily have to bend in order to lower the scoop. Loosely mounted on the conical stud 21 is a sleeve 23 interiorly provided with a tapering bore to accommodate the stud 21, and formed integral with the sleeve or otherwise secured thereto is the usual handle member or grip comprising the yoke 24 provided with a central perforation for the reception of the stud 21 and having secured to either end a grip bar 25. A washer 26 is fitted over that portion of the sleeve extending beyond the yoke 24 and the parts are retained in place by the cotter pin 27 extending through a perforation formed in the upper end of the stud 21. With the construction thus far described, it can be readily seen that when the parts occupy the position shown in Fig. 1, a movement on the part of the operator grasping the bars 2 and 25 to force the scoop or fork into material to be worked, will result in the shank 15 yielding slightly, thus giving the operator a bracing power and command over the load which is impossible with the ordinary plain or rigid handle.

While a great value of the device is experienced in delivering the load over the scoop or fork, the spring enabling the load to be thrown a greater distance with less effort on the part of the operator, the scoop rebounding back into position ready for use again, the value of this device is especially desirable when loading a wagon with grain, hay or the like, where the operator has to throw a load above the level of his head, the spring enabling him to do this with greater ease and facility.

A collar 28 is loosely fitted on the auxiliary shank 15, the function of which is to securely bind the shank to the rear wall 13, or, if the operator so desires, the collar may be slipped higher on the shank and the handle will drop into the scoop out of use.

What is claimed is:—

1. An auxiliary handle embodying a longitudinally adjustable shank member, and means for securing the same to the shank of a shovel, pitch-fork, or other like implement.

2. An auxiliary handle embodying a longitudinally adjustable resilient shank member, and means for securing the same to a shank of a shovel, pitch-fork, or other like implement.

3. An auxiliary handle embodying a shank member adapted to be secured to the shank of a shovel, pitch-fork or other like implement, an adjustable sleeve slidably fitted on said shank member having a platform on one end, and a hand grip mounted on said platform.

4. An auxiliary handle embodying a shank member adapted to be secured to the shank of a shovel, pitch-fork or other like implement, an adjustable sleeve slidingly fitted on said shank member having a platform on one end, a stud on the platform, and a hand grip mounted on the stud for universal movement.

5. An auxiliary handle embodying an adjustable shank member mounted on an adjustable support adapted to be detachably secured to the shank of a shovel, pitch-fork or other like implement.

6. An auxiliary handle embodying an adjustable resilient shank member pivotally mounted on an adjustable support, said support adapted to be adjustably secured to the shank of a shovel, pitch-fork or like implement.

7. An auxiliary handle embodying a support adapted to be secured to the shank of a shovel, pitch-fork or other like implement and having a pocket formed thereon, and a longitudinally adjustable shank member secured in the pocket.

8. An auxiliary handle embodying a support adapted to embrace the shank of a shovel, pitch-fork or the like, and provided with a pocket having side walls and an outwardly inclined rear wall, projecting beyond the plane of said side walls, an auxiliary shank member pivotally mounted within said pocket and adapted to bear on the rear wall thereof.

9. An auxiliary handle embodying an adjustable support formed of two sections pivotally connected, a pocket on one of said sections having side walls, and an elongated rear wall, a resilient shank member pivotally mounted in said pocket, and means for detachably securing said adjustable support to the shank of a shovel, pitch-fork, or other implement, in its adjusted positions.

10. An auxiliary handle embodying an adjustable support formed of two sections pivotally connected, a pocket on one of said sections having side walls, and an elongated rear wall, an auxiliary resilient shank member pivotally mounted in said pocket, and a means for clamping said shank to the rear wall of said pocket.

11. An auxiliary handle embodying an adjustable support formed of two sections pivotally connected, a pocket on one of said sections having side walls, and an elongated rear wall, an adjustable auxiliary shank member pivotally mounted in said pocket, and a collar adapted to clamp said shank member to the rear wall of said pocket.

In testimony that I claim the foregoing as my own, I have hereto affixed my signature in the presence of two witnesses.

GUSTAV A. BYOR.

Witnesses:
B. J. RICHARDS,
W. E. VAN BRUNT.